United States Patent [19]

Schmidt et al.

[11] 4,415,719

[45] * Nov. 15, 1983

[54] THERMOPLASTIC, BRANCHED AROMATIC POLYPHOSPHONATES, AND A PROCESS FOR THEIR PRODUCTION

[75] Inventors: Manfred Schmidt, New Martinsville, W. Va.; Ludwig Bottenbruch; Dieter Freitag, both of Krefeld, Fed. Rep. of Germany; Klaus Reinking, Wermelskirchen, Fed. Rep. of Germany; Harry Röhr, Frechen, Fed. Rep. of Germany; Hans-Dieter Block, Cologne, Fed. Rep. of Germany

[73] Assignee: Bayer Aktiengesellschaft, Leverkusen, Fed. Rep. of Germany

[*] Notice: The portion of the term of this patent subsequent to May 25, 1999 has been disclaimed.

[21] Appl. No.: 328,383

[22] Filed: Dec. 7, 1981

Related U.S. Application Data

[62] Division of Ser. No. 160,646, Jun. 18, 1980, Pat. No. 4,331,614.

[30] Foreign Application Priority Data

Jun. 22, 1979 [DE] Fed. Rep. of Germany ....... 2925207

[51] Int. Cl.$^3$ .............................................. C08G 79/04
[52] U.S. Cl. ..................................... 528/167; 260/930; 524/592; 524/609; 524/610; 524/841; 528/125; 528/126; 528/128; 528/169
[58] Field of Search ............................... 528/167–169, 528/125, 126, 128; 260/930; 524/592, 609, 610, 841

[56] References Cited

U.S. PATENT DOCUMENTS

| | | | |
|---|---|---|---|
| 2,636,876 | 4/1953 | Zenftman et al. | 528/167 |
| 2,682,522 | 6/1954 | Coover, Jr. et al. | 528/167 |
| 4,072,658 | 2/1978 | Okamoto et al. | 528/167 |
| 4,331,614 | 5/1982 | Schmidt et al. | 260/930 |

Primary Examiner—Lester L. Lee
Attorney, Agent, or Firm—Connolly and Hutz

[57] ABSTRACT

Thermoplastic, branched aromatic polyphosphonates with average molecular weights (number average $M_n$) of from 11,000 to more than 200,000, obtainable by transesterifying (a) from 97 to 100 moles of at least one diaryl phosphonate, and (b) from 0 to 3 moles of at least one triaryl phosphate—the sum of the moles of (a) and (b) being 100—with (c) from 90 to 99 moles of at least one aromatic dihydroxy compound, and (d) from 0 to 3 moles of at least one aromatic trihydroxy or tetradhydroxy compound—with the proviso that at least one of the components (b) and (d) is present in a quantity of at least 0.001 mole and that, where (b) and (d) are used, the maximum limit on the moles is 3.0.

9 Claims, No Drawings

THERMOPLASTIC, BRANCHED AROMATIC POLYPHOSPHONATES, AND A PROCESS FOR THEIR PRODUCTION

This application is a division of application Ser. No. 160,646 filed June 18, 1980 now U.S. Pat. No. 4,331,614.

This invention relates to thermoplastic, branched aromatic polyphosphonates having average molecular weights (number average $\overline{M}_n$) of from about 11,000 to more than 200,000, to a process for their production by transesterification and to the use of these polyphosphonates for the production of thermoplastic mouldings.

It is known that linear aromatic polyphosphonates can be produced by condensing aryl phosphonic acid dichlorides and aromatic diol compounds in a solvent either in the absence of a catalyst or in the presence of alkaline-earth metal halides as catalyst as is described in U.S. Pat. Nos. 3,946,093 and 3,919,363. The polyphosphonates are recovered from the solutions obtained either by precipitation with methanol or by evaporating off the solvents. In either case, linear polyphosphonates of relatively low molecular weight ($\overline{M}_n$ 6000 to 11,000) are obtained, still containing residues of organically bound chlorine (cf. Comparison Example 1 of the present application). They may be used as flameproofing additives for plastics. Polyphosphonates of this type are unsuitable for use as starting materials for the production of thermoplastic mouldings both because of their excessively low molecular weight and because of their residual chlorine content which can be split off or hydrolysed at elevated temperature.

According to U.S. Pat. No. 4,046,724, linear polyphosphonates having average molecular weights ($\overline{M}_n$) of from 300 to 70,000 are said to be combined with polyalkylene terephthalates in order to improve their flame resistance. This U.S. patent specification does not contain any mention of the process by which the linear polyphosphonates of high molecular weight are produced. The Examples of this U.S. patent refer solely to polyphosphonates which have an average molecular weight ($\overline{M}_n$) of at most 12,000.

In addition, it is known from U.S. Pat. No. 2,682,522 that phosphonic acid diaryl esters may be transesterified with aromatic dihydroxy compounds in the melt at 100° C. to 400° C. in the presence of catalytic quantities of anhydrous alkaline-earth metal halides initially at atmospheric pressure and then under reduced pressure to form linear, aromatic polyphosphonates, the volatile constituents being removed by distillation. In this case, too, the polymers obtained do not have the high molecular weight required for use as chemical materials. In this process, the velocity of the transesterification reaction in the melt is so low that it is not possible to obtain commercially useful polymers having a sufficiently high degree of condensation (cf. also Comparison Example 2 of the present application).

Finally, it is known inter alia from U.S. Pat. No. 2,716,101 that alkyl or aryl phosphonyl dichlorides, aromatic dihydroxy compounds and phosphorus oxychloride or phenyl dichlorophosphate can be condensed in the presence of anhydrous magnesium chloride with the elimination of hydrogen chloride and phenol to form polyphosphonates containing phosphate groups as branching sites. Although the rubber-like polymers obtained may formally contain structures as indicated under A and B of the present application (where c=0, a=1, b=1 and $R^2$=X), they differ from the polyphosphonates according to this invention in that they have average molecular weights (number average $\overline{M}_n$) of far less than 11,000 and are unsuitable for the production of mouldings having high thermal stabilities under load and outstanding mechanical properties, as also shown by Comparison Examples 3 and 4 of the present application.

The hitherto known linear aromatic polyphosphonates are always used as additives for other polymers in order to improve the flame resistance of the mixtures thus obtained.

The object of the present invention is to provide thermoplastic polyphosphonates which may be used as such, i.e. without the addition of other polymers, for the production of mouldings characterised by high flame resistance, high thermal stability under load and outstanding mechanical properties.

According to the invention, this object is achieved in that, starting always from materials having a purity of more than 99.1% and preferably more than 99.7%, diaryl phosphonates which may contain small quantities of triaryl phosphates are transesterified with aromatic dihydroxy compounds, which may be mixed with small quantities of at least trifunctional, aromatic hydroxy compounds (one of the two branching agents, triaryl phosphate and the at least difunctional aromatic hydroxy compounds, must be present in the reaction mixture) in the presence of basic catalysts to form aromatic branched polyphosphonates having average molecular weights (number average $\overline{M}_n$) of at least 11,000.

Accordingly, the present invention relates to thermoplastic, branched aromatic polyphosphonates with average molecular weights (number average $\overline{M}_n$) of from 11,000 to more than 200,000, consisting of recurring units of the following structures:

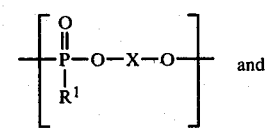 and (A.)

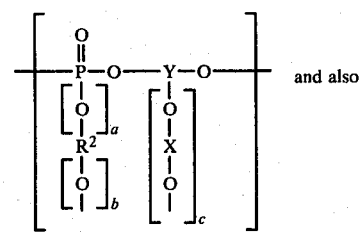 and also (B.)

(C.) the terminal members bound to phosphorus in the structures A and B

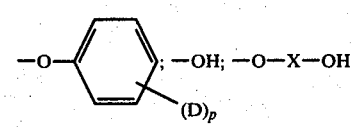

and the terminal members bound to oxygen

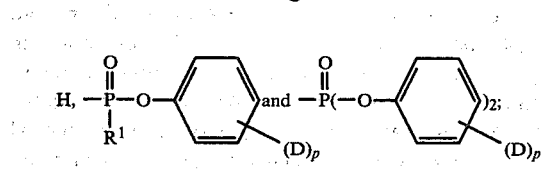

(the symbols X, D, p and $R^1$ are defined below), the proportion of (B.) based on the sum of A and B, amounting to between 0.001 and 3 mole percent; the symbols used in the structures and formulae have the following meanings:

$R^1$ represents at least one of the radicals;
$C_1$–$C_{12}$ alkyl;
$C_2$–$C_{12}$ alkenyl;
$C_6$–$C_{30}$ cycloalkyl, cycloalkenyl, aryl, arylalkyl or arylalkenyl, the aryl group in each case being unsubstituted or substituted by 1 to 5 $C_1$–$C_4$ alkyl groups or by 1 to 5 halogen atoms (fluorine, chlorine or bromine) or by the above-mentioned alkyl groups and halogen atoms;

X represents at least one of the following radicals:

| | |
|---|---|
| phenylene | |
| biphenyl | |
| $C_1$–$C_4$ alkylene bis-phenylene | —alkylene— |
| $C_5$–$C_{12}$ cycloalkylene bis-phenylene | —cycloalkylene— |
| thiobis-phenylene | —S— |
| oxy-bis-phenylene | —O— |
| sulphonyl-bis-phenylene | —$SO_2$— |
| carbonyl-bis-phenylene | —C(=O)— |
| naphthylene | | each phenyl nucleus being unsubstituted or substituted by 1 to 4 $C_1$–$C_4$ alkyl groups or by 1 to 4 halogen atoms (fluorine, chlorine or bromine) or by the above-mentioned alkyl groups and halogen atoms and the naphthylene nucleus being unsubstituted or substituted by 1 to 6 of at least one of the above-mentioned groups or atoms;

Y represents a trifunctional or tetrafunctional residue of a trifunctional mononuclear or trifunctional or tetrafunctional polynuclear phenol from which the phenolic hydroxyl groups have been removed in the case of the polynuclear phenol, the aromatic nuclei carrying one or two phenolic hydroxy groups are connected by aliphatic $C_1$–$C_7$ hydrocarbon radicals or by at least one benzene radical;

Y represents X where c=0, a=1, b=1 and, at the same time, $R^2$=Y'$-(O-X-O-)_{c'}$, or
$R^2$=X with Y'=Y and c'=1 or 2;
a=0 or the number 1;
b=0 or the number 1;
c=0 or one of the numbers 1 or 2, preferably c=1 or 2;
$R^2$=$R^1$ where a and b are each 0, in which case Y must represent a trifunctional or tetrafunctional radical, as defined above;
$R^2$ represents

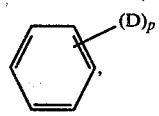

where a=1 and b=0, in which case Y must represent a trifunctional or tetrafunctional radical, as defined above;
$R^2$ represents X or Y'$-(O-X-O)_{c'}$ where a and b are each the number 1;
D represents the same or different groups and represents a $C_1$–$C_4$ alkyl group or halogen (F, Cl or Br) and p=0 or a number of from 1 to 5, preferably p=0.

The above definitions preferably have the following meaning:
$R^1$ represents at least one of radicals methyl or phenyl, particularly methyl;
X represents at least one of the radicals phenylene, biphenylylene, $C_1$–$C_4$ alkylene bisphenylene, in which case each phenyl nucleus may be substituted by 1 to 4 methyl groups, cyclohexylene-bis-phenylene, oxy-bis-phenylene, thio-bis-phenylene, sulphonyl-bis-phenylene, particularly $C_1$–$C_4$ alkylene-bis-phenylene, in which case each phenyl nucleus may be substituted by one or two methyl groups;
Y represents a trifunctional or tetrafunctional residue of a trifunctional mononuclear or trifunctional or tetrafunctional polynuclear phenol from which the phenolic hydroxyl groups have been removed; in the case of the polynuclear phenol, the aromatic nuclei carrying one or two phenolic hydroxy groups may be connected by aliphatic $C_1$–$C_7$ hydrocarbon radicals or by at least one benzene radical;
a=0 or the number 1;
b=0 or the number 1;
c=one of the numbers 1 or 2;
$R^2$=$R^1$ where a and b are each 0;
$R^2$ represents

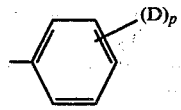

where a=1 and b=0;
$R^2$ represents X or Y'$-(O-X-O-)_{c'}$ where a and b are each the number 1;
D represents the same or different groups and represents a $C_1$–$C_4$ alkyl group and p=0 or a number of from 1 to 5, more particularly p=0.

The thermoplastic, branched aromatic polyphosphonates according to the invention preferably have average molecular weights (number average $\overline{M}_n$) of from 13,000 to 80,000 and more particularly from 13,000 to 40,000. The molecular weights are determined by membrane osmosis using membranes which are permeable to particles having a molecular weight of up to 3,000.

The present invention also relates to a process for the production of thermoplastic, branched aromatic polyphosphonates having average molecular weights (number average $\overline{M}_n$) of from 11,000 to more than 200,000 by transesterification which is characterised in that (a) from 97 to 100 moles of at least one diaryl phosphonate and (b) from 0 to 3 moles of at least one triaryl phosphate, the sum of the moles of (a) and (b) being 100, are transesterified with (c) from 90 to 99 moles of at least one aromatic dihydroxy compound and (d) from 0 to 3 moles of at least one aromatic trihydroxy or tetrahydroxy compound—with the proviso that at least one of the components (b) and (d) is present in a quantity of at least 0.001 mole and that, where (b) and (d) are used, the maximum limit on the moles is 3—in the melt at 90° C. to 340° C. in an oxygen-free gas atmosphere either at atmospheric pressure or under reduced pressure and in the presence of from $10^{-5}$ to $5.10^{-2}$ mole percent, based on 100 mole percent of aromatic dihydroxy compound, of at least one basic catalyst, the volatile constituents being removed by distillation.

The transesterification reaction is preferably carried out with components (a), (b), (c) and (d), component (a) being used in quantities of from 98.5 to 99.999 moles, more particularly in quantities of from 99.25 to 99.975 moles, component (c) being used in a quantity of from 93 to 97 moles and components (b) and (d) each being used in quantities of from 0.001 to 1.5 moles and, more particularly, in quantities of from 0.025 to 0.75 mole.

Phosphonic acid diaryl esters corresponding to formula I below are preferably used for transesterification.

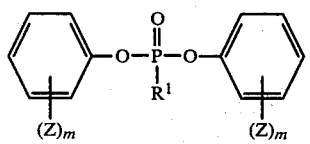

In this formula:
R¹ represents at least one of the following radicals:
$C_1$-$C_{12}$ alkyl,
$C_2$-$C_{12}$ alkenyl,
$C_6$-$C_{30}$ cycloalkyl, cycloalkenyl, aryl, arylalkyl or arylalkenyl, the aryl group in each case being unsubstituted or substituted by 1 to 5 $C_1$-$C_4$ alkyl groups or by 1 to 5 halogen atoms (F, Cl or Br) or by the above-mentioned alkyl groups and halogen atoms;

Z represents F, Cl, Br or $C_1$-$C_4$ alkyl and several Z's in one aryl radical are the same or different, and m=0 or an integer of from 1 to 5.

It is particularly preferred to use methy or phenyl phosphonic acid diphenyl ester.

Preferred aromatic dihydroxy compounds correspond to formulae II and III below

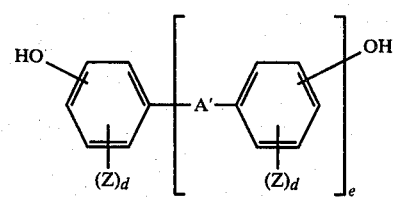

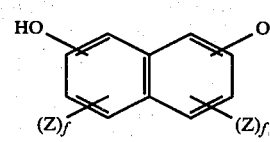

in which
A' represents a single bond, an alkylene group containing from 1 to 4 carbon atoms, a cycloalkylene group containing 5 or 6 carbon atoms, a sulphonyl group, a carbonyl group, oxygen or sulphur,
e=the number 0 or 1,
Z represents F, Cl, Br or $C_1$-$C_4$ alkyl and several Z's in one aryl radical are the same or different,
d=the integers 0 or 1 to 4,
f=the integers 0 or 1 to 3.

It is particularly preferred to use compounds of formula II in which e=1 and A' is a single bond, the 2,2-propylene radical or sulphur and d=0, but more especially 2,2-bis-(4-hydroxy phenyl)-propane and 4,4'-dihydroxy diphenyl.

Preferred triaryl phosphates correspond to the following formula:

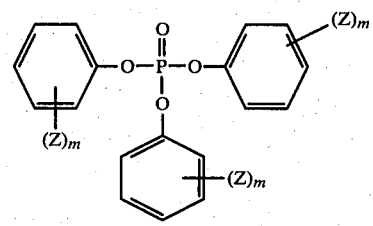

in which Z and m are as defined for formula I. It is particularly preferred to use triphenyl phosphate.

Preferred trihydroxy and tetrahydroxy compounds are phloroglucinol; 4,6-dimethyl-2,4,6-tri-(4-hydroxy phenyl)-2-heptene; 4,6-dimethyl-2,4,6-tri-(4-hydroxy phenyl)-heptane; 1,3,5-tri-(4-hydroxy phenyl)-benzene; 1,1,1-tri-(4-hydroxy phenyl)-ethane; tri-(4-hydroxy phenyl)-phenyl methane; 2,2-bis-[4,4-bis-(4-hydroxy phenyl)-cyclohexyl]-propane; 2,4-bis-(4-hydroxy phenyl)-isopropyl phenol; 2,6-bis-(2'-hydroxy-5'-methyl benzyl)-4-methyl phenol; 2-(4-hydroxy phenyl)-2-(2,4-dihydroxy phenyl)-propane; tetra-(4-hydroxy phenyl)-methane; tetra-[4-(4-hydroxy phenyl isopropyl)-phenoxy]-methane and 1,4-bis-(4,4''-dihydroxy triphenyl methyl)-benzene or mixtures thereof.

Basic catalysts which may be used for the transesterification reaction include:
alcoholates of the alkali or alkaline earth metals, such as sodium methylate or calcium methylate;
sodium, potassium or lithium phenolates of monofunctional phenols;
sodium, potassium or lithium salts of the above-mentioned aromatic dihydroxy compounds corresponding to general formulae II and III;

hydrides of the alkali or alkaline earth metals, such as lithium hydride, sodium borohydride or calcium hydride; oxides of the alkali and alkaline earth metals, such as lithium oxide, sodium oxide or barium oxide; amides of the alkali and alkaline earth metals, such as sodium amide or calcium amide, and basically reacting salts of the alkali or alkaline earth metals with organic or inorganic acids, such as sodium acetate, sodium benzoate or sodium carbonate.

Imidazole is also suitable. Mixtures of the above-mentioned catalysts may also be used. However, it is preferred to use monofunctional alkali metal phenolates, such as sodium phenolate.

The basic catalysts are preferably used in quantities of from $7.10^{-4}$ to $2.10^{-3}$ mole percent, based on 100 mole percent of aromatic dihydroxy compound.

All of the starting materials used for the transesterification reaction should have purities of more than 99.1% and preferably of more than 99.7%.

To carry out the process according to the invention, the phosphonic acid diaryl esters and, optionally, triaryl phosphates are reacted with the aromatic dihydroxy compounds which may be mixed with trihydroxy or tetrahydroxy compounds in an oxygen-free atmosphere, i.e. in the presence of an inert gas, such as nitrogen or carbon dioxide for example, and in the presence of the above-mentioned basic catalysts at temperatures in the range of from 90° to 340° C., and, more particularly, at temperatures in the range from 150° to 320° C. While the volatile aromatic monohydroxy aryls are distilled off at elevated temperature, preferably in vacuo, the reaction is continued with introduction of inert gas until the required degree of condensation is reached.

By adding a base-binding substance, such as for example dimethyl sulphate, diethyl sulphate, benzoyl chloride or phenyl chloroformic acid ester, it is possible to neutralise the basic catalyst towards the end of the reaction in the polymer melt. The volatile neutralisation products formed may be removed from the melt by distillation in vacuo. After the catalyst has been neutralised, the transesterification reaction may be continued to a limited extent in order to reach a required molecular weight.

On completion of the polycondensation reaction, the polyphosphonate melt formed is converted in the usual way into granulates or directly into shaped structures, such as films, fibres or bristles. The polyphosphonates thus obtained may be processed in the melt in standard processing machines, such as extruders and injection-moulding machines, into products characterised by extreme flame resistance and high thermal stability under load. Other valuable properties of the polyphosphonates according to the invention are their excellent mechanical properties, such as for example their extreme toughness and their high tensile strength.

The thermoplastic, aromatic branched polyphosphonates according to the invention have relative viscosities of from 1.20 to more than 2.0 and preferably from 1.24 to 1.40, as measured on a 0.5% by weight solution in methylene chloride at 25° C.

The polyphosphonates according to the invention are soluble in methylene chloride; 1,1,2,2-tetrachloroethane; trichloroethylene; chloroform; chlorobenzene; 1,2-dichlorobenzene; dioxane and hexamethyl phosphoric acid triamide (HMPT).

Antistatic agents, pigments, mould release agents, heat stabilisers, UV stabilisers, fillers such as for example talcum, mineral wool, mica, calcium carbonate, dolomite and others, and also reinforcing fillers, such as for example glass fibres, glass beads and asbestos, may be added to and mixed with the polyphosphonates.

The thermoplastic, aromatic, branched, preferably halogen-free polyphosphonates according to the invention may be used for any applications where thermoplastic chemical materials of very high flame resistance are required and where, in addition, it is desired to avoid the evolution of toxic pyrolysis gases under the effect of very high temperatures. Applications such as these may be found for example in vehicle construction, in aircraft construction, in the space sector or in the safety field.

The thermoplastic, aromatic polyphosphonates obtained by the process according to the invention as described above were extruded into test specimens at 240° to 320° C.

Their behaviour under impact stressing was tested both by measuring impact strength according to Charpy $a_n$ in accordance with DIN No. 53 453 or ASTM D No. 256 and by measuring notched impact strength according to Charpy $a_k$ in accordance with DIN No. 53 453 or ASTM D 256. Hardness was measured by measuring the ball indentation hardness HK in accordance with DIN No. 53 456. The mechanical-elastic properties were tested by strain-deformation tests, for example by measuring the E-modulus in bend in accordance with DIN No. 53 457, by measuring the E-modulus in tension in accordance with DIN No. 53 457, by measuring ultimate tensile strength $\sigma_R$, elongation at break $\epsilon_R$, yield strength $\sigma_S$ and elongation at yield, $\epsilon_S$ in accordance with DIN No. 53 455 (1968) or ASTM D 882.

Thermal stability under load was tested by measuring the Vicat softening point (VSP) in accordance with DIN No. 53 460 or ISO/R 75. The second-order transition temperatures $T_E$ were determined by differential thermoanalysis (DTA).

Fire resistance was tested both by measuring the $O_2$ index in accordance with ASTM D 2863-70 and also by measuring the after-burning time in accordance with the UL test (Subject 94).

For these tests, test bars measuring $127 \times 12.7 \times 1.6$ mm (1/16") and $127 \times 12.7 \times 3.2$ mm (⅛") were produced by injection moulding at 300° to 310° C. These test bars were subjected to the test defined in Bulletin 94 of Underwriters Laboratories, Inc. (Burning Test for Classifying Materials).

In this test, the tested materials are given classifications of UL-94 V-O, UL-94 V-I and UL-94 V-II on the basis of the results obtained with the ten test specimens. Briefly, the criteria for each of these UL-94 V-classifications are as follows:

UL-94 V-O: the average burning and/or glowing time after removal of the ignition flame should not exceed 5 seconds and none of the test specimens should release any drips which ignite absorbent cotton wool.

UL-94 V-I: the average burning and/or glowing time after removal of the ignition flame should not exceed 25 seconds and none of the test specimens should release any drips which ignite absorbent cotton wool.

UL-94 V-II: the average burning and/or glowing time after removal of the ignition flame should not exceed 25 seconds and the test specimens release flaming particles which ignite absorbent cotton wool.

In addition, a test bar which burnt for more than 25 seconds after removal of the ignition flame is not classified under UL-94, but instead is said to "burn" under the standard conditions of the present invention. A further requirement of the UL-94 test is that all the test bars used for one and the same test must achieve the particular V-classification, otherwise the ten best bars received the classification of the worst individual bar. If for example one bar achieves the classification UL-94 V-II and the other nine test bars the classification UL-94 V-O, all ten bars are given the classification UL-94 V-II.

EXAMPLE 1

6204 g (25.02 moles) of methyl phosphonic acid diphenyl ester, 4424 g (23.78 moles) of 4,4'-dihydroxy diphenyl, 7.6 g ($1.21.10^{-2}$ moles) of 1,4-bis(4,4''-dihydroxy triphenyl methyl)-benzene and 0.2 g ($1.72.10^{-3}$ moles) of sodium phenolate are intensively mixed under nitrogen at 250° C. in an autoclave. Phenol is distilled off through a column heated to 100° C. over a period of three hours under a vacuum falling from 250 to 100 mbar and at a temperature increasing from 250° C. to 265° C. The transesterification reaction is then continued for 5 hours under a pressure gradually falling to 0.3 mbar and at an internal temperature increasing to 310° C., the viscosity of the melt increasing. The autoclave is purged with nitrogen, the polymer is left to sediment for 1 hour at 300° C. with the stirrer switched off and the product is isolated by spinning off under pressure (approximately 10 atmospheres) and granulating the melt strand. A high molecular weight amorphous polyphosphonate having a molecular weight (number average $M_n$) of 27,600 and a relative viscosity $\eta_{rel}$ of 1.321 (as measured on a 0.5% by weight solution in methylene chloride at 25° C.) is obtained in a yield of 5.2 kg. P=12.6% by weight. Flame resistance values and mechanical properties of the polyphosphonate according to Example 1:

| Test | Test Standard | Test Value |
|---|---|---|
| O$_2$-index | ASTM-D 2863-70 | 75% |
| UL-test (Subject 94) | | VO (1/16") after burning time: 0 second |
| Vicat B | DIN 53 460 | 130° C. |
| Impact strength a$_n$ | DIN 53 453 | unbroken |
| Notched impact strength a$_k$ | DIN 53 453 | 32 |
| Ball indentation hardness HK | DIN 53 456 | 102 MPa |
| E-modulus in bend | DIN 53 457 | 2610 MPa |
| Flexural strength | DIN 53 457 | 59 MPa |
| E-modulus in tension | DIN 53 457 | 2420 MPa |
| Yield strength $\sigma_S$ | DIN 53 455 (1968) | 56 MPa |
| Elongation at yield $\epsilon_S$ | DIN 53 455 | 8% |
| Ultimate tensile strength $\sigma_R$ | DIN 53 455 | 44 MPa |
| Elongation at break $\epsilon_R$ | DIN 53 455 | 21% |

EXAMPLE 2

774.4 g (3.12 moles) of methyl phosphonic acid diphenyl ester, 677.0 g (2.97 moles) of 2,2-bis(4-hydroxy phenyl)-propane (=bisphenol A), 9.4 g ($1.5.10^{-2}$ moles) of 1,4-bis-(4,4''-dihydroxy triphenyl methyl)-benzene and 0.1 g ($8.62.10^{-4}$ moles) of sodium phenolate are transesterified in the melt as described in Example 1. 0.77 kg of a polyphosphonate having the following values are obtained:

Molecular weight (number average $\overline{M}_n$) = 21,400
Relative solution viscosity $\eta_{rel}$ = 1.270 (as measured on a 0.5% by weight solution in methylene chloride at 25° C.)
P=10.7% by weight.
The amorphous polymer has a second order transition temperature $T_E$ of 90° C., as determined by DTA (=differential thermoanalysis).

EXAMPLE 3

155.10 g (0.639 mole) of methyl phosphonic acid diphenyl ester, 88.56 g (0.472 mole) of 4,4'-dihydroxy diphenyl, 31.90 g (0.1187 mole) of 1,1-bis-(4-hydroxy phenyl)-cyclohexane, 0.19 g ($0.304.10^{-3}$ mole) of 1,4-bis-(4,4''-dihydroxy triphenyl methyl)-benzene and 5 mg ($0.304.10^{-4}$ mole) of sodium phenolate are transesterified in the melt as described in Example 1. 150 g of an amorphous polyphosphonate having the following values are obtained:

| | | |
|---|---|---|
| $\overline{M}_n$ | = 29,100 | measured by methods described in Examples 1 and 2 |
| $\eta_{rel}$ | = 1.350 | |
| P | = 11.9% by weight | |
| $T_E$ | = 137° C. (as determined by DTA) | |

EXAMPLE 4

336 g (1.0 mole) of 2-phenyl ethylene phosphonic acid diphenyl ester, 185.8 g (0.999 mole) of 4,4'-dihydroxy diphenyl, 0.626 g ($1.10^{-3}$ mole) of 1,4-bis(4,4''-dihydroxy phenyl methyl)-benzene and 10 mg ($0.765.10^{-4}$ mole) of potassium phenolate are reacted as described in Example 1. 520 g of a high molecular weight amorphous polyphosphonate having the following values are obtained:

| | | |
|---|---|---|
| $\overline{M}_n$ | = 15,100 | measured by the methods described in Examples 1 and 2 |
| $\eta_{rel}$ | = 1.221 | |
| P | = 9.7% by weight | |
| $T_E$ | = 140° C. (as determined by DTA) | |
| O$_2$ index | = 58% (as determined in accordance with ASTM-D 2863-70) | |

COMPARISON EXAMPLE 1

Example 1 of U.S. Pat. No. 3,919,363 was repeated exactly. The polymer was isolated by precipitation in methanol. The poly-(sulphonyl diphenylene)-phenyl phosphonate thus obtained has an average molecular weight (number average $\overline{M}_n$) of 9,700, as determined by membrane osmosis, and a relative solution viscosity $\eta_{rel}$ of 1.164 (as measured on a 0.5% solution in methylene chloride at 25° C.). The residual content of hydrolysable chlorine amounted to 130 ppm; $T_E$=151° C. (as determined by DTA). The film prepared from a solution of this polymer in methylene chloride is brittle. The polymer can be thermoplastically processed into hard and extremely brittle mouldings which actually break on removal from the mould. Because of its low molecular weight and its high residual content of hydrolysable terminal chlorine groups, this polymer is unsuitable for use as a thermoplastic material.

COMPARISON EXAMPLE 2

Example 2 of U.S. Pat. No. 2,682,522 was repeated exactly. The poly-(resorcinyl)-phenyl phosphonate thus obtained had an average molecular weight (number average $M_n$) of 7600, as determined by membrane osmosis, and a relative solution viscosity $\eta_{rel}$ of 1.147 (as measured on a 0.5% solution in methylene chloride at 25° C.). The inorganic chlorine content amounted to 70 ppm. Because of its low molecular weight, the polymer was extremely brittle and was therefore unsuitable for use as a thermoplastic material.

EXAMPLE 5

3100 g (12.5 moles) of methyl phosphonic acid diphenyl ester, 3.35 g ($1.03.10^{-2}$ moles) of triphenyl phosphate, 2216.2 g (11.92 moles) of 4,4'-dihydroxy diphenyl and 0.1 g ($0.862.10^{-3}$ mole) of sodium phenolate were transesterified in the melt as described in Example 1. 2.6 kg of an amorphous polyphosphonate having the following values are obtained:
$\overline{M}_n = 28,800$
$\eta_{rel} = 1.332$
P = 12.6% by weight
Vicat-B temperature (DIN No. 53 460): 130° C.

EXAMPLE 6

3102 g (12.51 moles) of methyl phosphonic acid diphenyl ester, 1.7 g ($0.52.10^{-2}$ moles) of triphenyl phosphate, 2.44 g ($0.39.10^{-2}$ moles) of 1,4-bis-(4,4''-dihydroxy triphenyl methyl)-benzene, 2214.7 g (11.91 moles) of 4,4'-dihydroxy diphenyl and 0.1 g ($0.862.10^{-3}$ moles) of sodium phenolate are transesterified in the melt as described in Example 1. 2.6 kg of an amorphous polyphosphonate having the following values are obtained:
$\overline{M}_n = 27,700$
$\eta_{rel} = 1.324$
P = 12.6% by weight
Vicat-B temperature (DIN No. 53 460): 130° C.

Comparison Examples 3 and 4 with U.S. Pat. No. 2,716,101

COMPARISON EXAMPLE 3

Example 3 of U.S. Pat. No. 2,716,101 was repeated exactly. Resorcinol, heptane phosphonyl dichloride and 5 mole percent of phosphorus oxychloride (based on 100 mole percent of heptane phosphonyl dichloride) were reacted at temperatures of up to 150° C. in the presence of anhydrous magnesium chloride, the reaction being accompanied by the elimination of hydrogen chloride. Towards the end of the reaction, the reaction mixture could no longer be stirred. After cooling, the resulting polymer was very brittle and did not dissolve in dioxane, methylene chloride or chlorobenzene. Neither the molecular weight nor the relative solution viscosity of this polymer could be measured because of its high degree of crosslinking and its resulting insolubility. The polymer obtained contained 870 ppm of hydrolysable chlorine. In view of its high content of hydrolysable chlorine, its brittleness and its high degree of crosslinking, this polymer is unsuitable for use as a thermoplastic chemical material.

COMPARISON EXAMPLE 4

Example 3 of U.S. Pat. No. 2,716,101 was repeated, the heptane phosphonyl dichloride being substituted by an equimolar quantity of methane phosphonyl dichloride.

Towards the end of the reaction, the resulting polymer could no longer be stirred. After cooling, it was brittle and did not dissolve in dioxane, methylene chloride or chlorobenzene. The polymer contained 420 ppm of hydrolysable chlorine. Neither the molecular weight nor the relative solution viscosity of the polymer could be measured on account of its high degree of crosslinking and its resulting insolubility. The polymer cannot be thermoplastically processed.

We claim:

1. A process for the production of a thermoplastic branched, aromatic polyphosphonate having a number average molecular weight of above 11,000 said process comprising transesterifying components (a) and (b) with (c) and (d) wherein component (a) is from 97 to 100 moles of at least one diaryl phosphonate and component (b) is up to 3 moles of at least one triaryl phosphate with the sum of the moles of (a) and (b) being 100, component (c) is from 90 to 99 moles of at least one aromatic dihydroxy compound and component (d) is up to 3 moles of at least one aromatic trihydroxy or tetrahydroxy compound with the proviso that at least one of the components (b) and (d) is present in a quantity of at least 0.001 mole and that the combined amount of (b) and (d) is at most 3 moles;

said transesterification being conducted in the melt at 90° C. to 340° C. in an oxygen-free atmosphere at atmospheric pressure or lower and in the presence of from $10^{-5}$ to $5 \times 10^{-2}$ mole percent, based on 100 mole percent of aromatic dihydroxy compound, of at least one basic catalyst, with the volatile constituents produced in the course of transesterification being removed by distillation.

2. The process according to claim 1 wherein the diaryl phosphonate of component (a) is of the formula

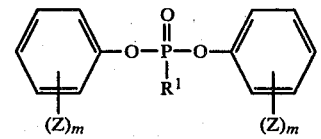

wherein $R^1$ is alkyl having 1 to 12 carbon atoms, alkenyl having 2 to 12 carbon atoms, cycloalkyl having 6 to 30 carbon atoms, cycloalkenyl having 6 to 30 carbon atoms, aryl having 6–30 carbon atoms, arylalkyl having 6–30 carbon atoms or arylalkenyl having 6–30 carbon atoms wherein each aryl moiety is unsubstituted or substituted by at least one halogen or alkyl having 1 to 4 carbon atoms;

Z is fluoro, chloro, bromo or alkyl having 1 to 4 carbon atoms and when more than one Z occurs on one aryl moiety they may be the same or different; and m is zero or an integer of from 1 to 5.

3. The process according to claim 2 wherein $R^1$ is methyl or phenyl and m is zero.

4. The process according to claim 1 wherein the aromatic dihydroxy compound of component (c) is of the formula

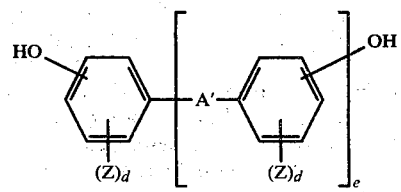

-continued
or

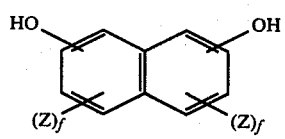

wherein A' is a single covalent bond, alkylene having 1 to 4 carbon atoms, cycloalkylene having 5 or 6 carbon atoms, sulphonyl, carbonyl, oxygen or sulphur;

e is zero or the number 1;

Z is fluoro, chloro, bromo or alkyl having 1 to 4 carbon atoms and when more than one Z occurs on one aryl moiety they may be the same or different;

d is zero or an integer of from 1 to 4; and f is zero or an integer of from 1 to 3.

5. The process as claimed in claim 4 wherein d is zero; e is the number 1; and A' is a single covalent bond, a 2,2-propylene moiety or sulphur.

6. The process as claimed in claim 1 wherein the aromatic trihydroxy or tetrahydroxy compound is selected from the group consisting of phloroglucinol; 4,6-dimethyl-2,4,6-tri-(4-hydroxy phenyl)-2-heptene; 4,6-dimethyl-2,4,6-tri-(4-hydroxy phenyl)-heptane; 1,3,5-tri-(4-hydroxy phenyl)-benzene; 1,1,1-tri-(4-hydroxy phenyl)-ethane; tri-(4-hydroxy phenyl)phenyl methane; 2,2-bis-[4,4-bis-(4-hydroxy phenyl)-cyclohexyl]-propane; 2,4-bis-(4-hydroxy phenyl)-isopropyl phenol; 2,6-bis-(2-hydroxy-5'-methyl benzyl)-4-methyl phenol; 2-(4-hydroxy phenyl)-2-(2,4-dihydroxy phenyl)-propane; tetra-(4-hydroxy phenyl)-methane; tetra-[4-(4-hydroxy phenyl isopropyl)-phenoxy]-methane; 1,4-bis-(4,4''-dihydroxy triphenyl methyl)-benzene and mixtures thereof.

7. The process according to claim 1 wherein the triaryl phosphate of component (b) is of the formula

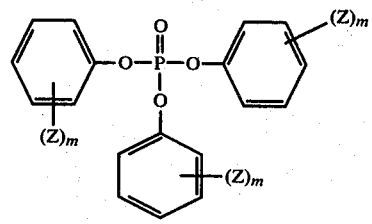

wherein Z is fluoro, chloro, bromo or alkyl having 1 to 4 carbon atoms and when more than one Z occurs on one aryl moiety they may be the same or different; and m is zero or an integer of from 1 to 5.

8. The process according to claim 1 wherein the triaryl phosphate is triphenyl phosphate.

9. A thermoplastic molding composition comprising the polyphosphonate prepared according to claim 1 or said polyphosphonate admixed with at least one antistatic agent, pigment, mould release agent, heat stabilizer, UV stabilizer, filler or reinforcing fiber.

* * * * *